United States Patent [19]

Stiller

[11] 4,114,973
[45] Sep. 19, 1978

[54] POWER SUPPLY FOR TRANSPORTABLE DEVICES

[76] Inventor: Paul Franklin Stiller, 23675 Smithtown Rd., Shorewood, Minn.

[21] Appl. No.: 774,197

[22] Filed: Mar. 3, 1977

[51] Int. Cl.$^2$ .................. H01M 2/10; H01R 13/54
[52] U.S. Cl. .................................. 339/92 M; 429/9
[58] Field of Search ............... 339/75 R, 75 M, 92 R, 339/92 M; 429/1, 9

[56] References Cited
U.S. PATENT DOCUMENTS 3,992,225  11/1976  Sykes .................................. 429/9 X Primary Examiner—Roy Lake
Assistant Examiner—E. F. Desmond
Attorney, Agent, or Firm—James R. Cwayna

[57] ABSTRACT

A power supply system which includes packaging and containing means for retaining a plurality of individual power sources therein, wherein the power sources are positively retained both laterally and longitudinally and are electrically connected to one another and are arranged to be connected to a circuit. A pair of deformable end plates having electrical contacts thereon are provided and longitudinal connectors are provided between the plates. The plate members have interconnecting circuitry elements thereon with a plurality of connecting rods and placement rods located between the plates to positively hold the batteries between the plates, which rods are provided with locating elements laterally thereof for positively holding the individual batteries in electrical contact between themselves and the plate members. The battery or power pack system is designed for utilization in various portable units wherein a long lasting power supply is desirable.

2 Claims, 8 Drawing Figures

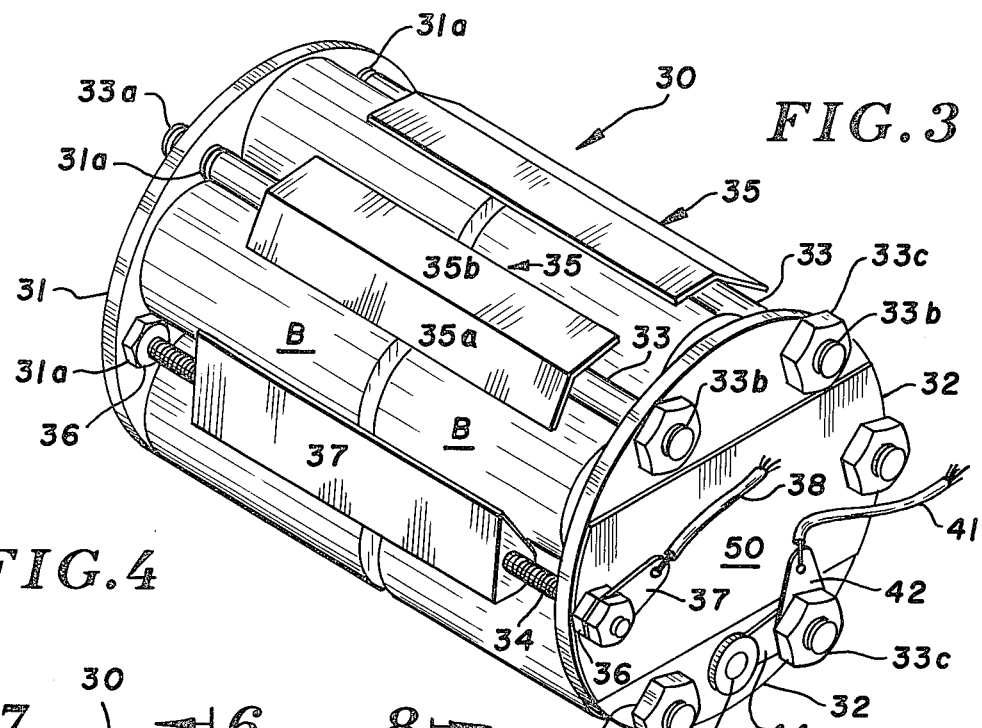

POWER SUPPLY FOR TRANSPORTABLE DEVICES

FIELD OF THE INVENTION

This invention relates to personally transportable systems which require a relatively long lasting compact power supply for the operation thereof, and is more specifically related to the design for a power pack system which includes a plurality of individual power cells for provision of the desired electrical output for operation of the transportable system.

BACKGROUND AND OBJECTS OF THE INVENTION

Various devices, such as flashlights and the like have been designed to utilize a relatively large, single battery unit for the generation of the electrical power required for the operation thereof. Applicant has provided herein a unique battery pack or power pack system for utilization in such a device, and has particularly illustrated his system in combination with an alarm or audio signal device which is self-contained and designed for protability. A normal audio device requires individual power packs which are utilized to transfer energy to individual bull-horn or other amplifying devices and these units are normally supplied as two piece units wherein the power pack is transported by the individual in some sort of packing or carrying type arrangement and the bull horn or amplifying or speaker device is remote therefrom but electrically connected to the supply.

With applicant's device, the entire apparatus of the invention is illustrated with a loudspeaking or amplifying type of unit, but the primary aspect of the unit is related to the battery or electrical power pack therefore which includes a plurality of individual battery elements which are joined together to provide a source of electrical energy. This battery pack is unique in its configuration and particularly in the structural elements thereof to maintain alignment through and of the individual batteries.

A primary advantage of applicant's battery pack system is to provide a unit wherein a plurality of readily available batteries may be interconnected and held in proper position for the generation of electrical power, and which, as a result, does not require a large single cell battery.

It is therefore an object of applicant's invention to provide an electrical energy power source package which consists of the means for interconnecting and holding pluralities of relatively small electrical sources for a combination thereof of a desired output.

It is a further object of applicant's invention to provide an electrical source package for easily transportable power systems such as amplifiers, bull horns and the like which includes means for positively holding a plurality of individual electrical sources in proper electrically connected position without the utilization of biasing means such as springs therefore.

It is still a further object of applicant's invention to provide a power pack unit which includes a first deformable plate having a plurality of electrically interconnecting members thereon to receive and make contact with one pole of a battery and having a second deformable plate on the opposite end thereof with a plurality of electrically connecting members arranged thereon to correspond with the first plate such that connection for series arrangement of batteries or power sources may be made between the plates and wherein the deformability of the plates allows for the proper positioning of the power sources therebetween such that no separate biasing members for maintaining electrical contact are required.

It is yet a further object of applicant's invention to provide a power pack or battery placement device for arranging a plurality of power storage units between a pair of plate members and wherein the connecting means between the plate members provides a means for holding the batteries or power sources from lateral movement such that the batteries are maintained in proper electrical relationship to one another.

It is yet a further object of applicant's invention to provide a power pack for systems requiring the same which includes the arrangement and placement of a plurality of individual power cells with means to join them electrically for the accumulation of the energy transmittable from each of the power cells.

These and other objects and advantages of the invention will more fully appear from the following description made in connection with the accompanying drawings in which the same numeral is used to designate the same or similar parts throughout the several views, and in which:

FIG. 3 is a perspective view of the energy pack including a plurality of individual battery elements as the same may be utilized in a device requiring such portable electrical energy;

FIG. 4 is a side elevation taken from FIG. 3;

FIG. 5 is an elevation taken from one end of FIG. 4;

FIG. 6 is a transverse section taken substantially along Line 6—6 of FIG. 4;

FIG. 7 is a transverse section taken substantially along Line 7—7 of FIG. 4; and, FIG. 8 is a transverse section taken substantially along Line 8—8 of FIG. 4.

Figure 1:
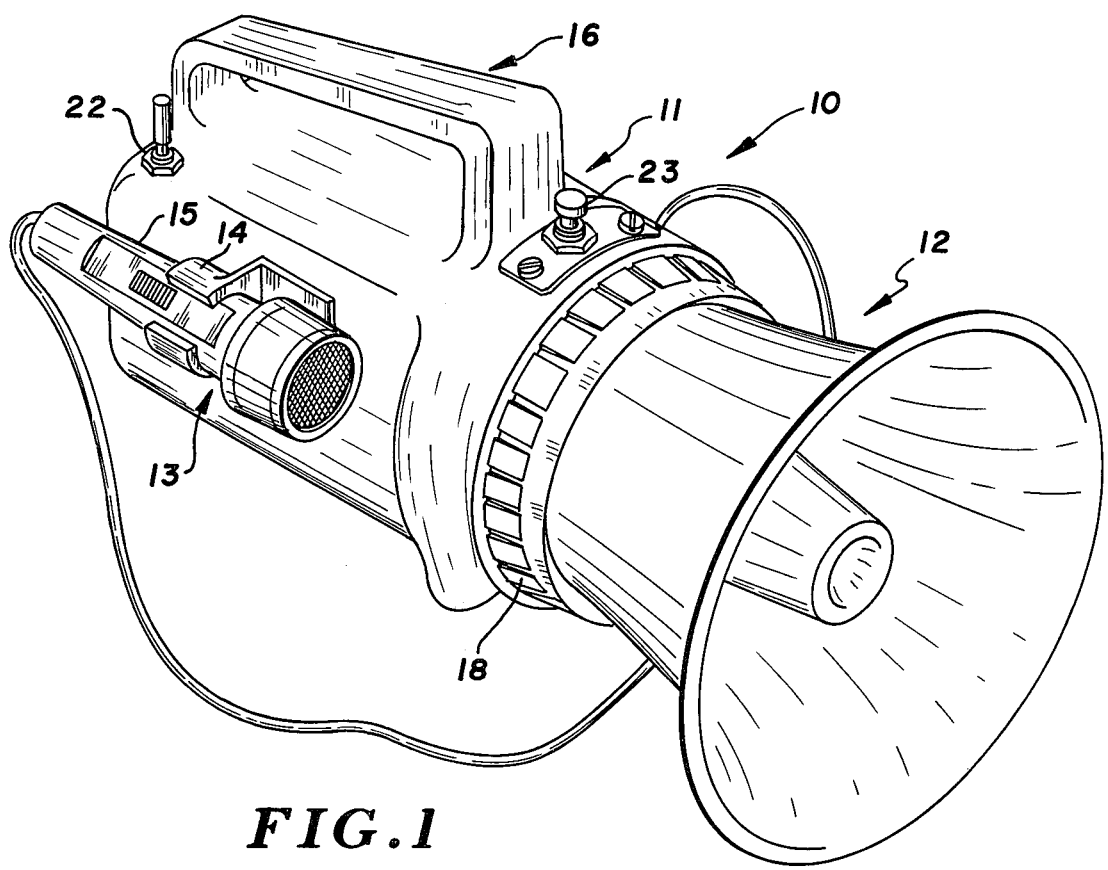
FIG. 1 is a perspective view of a selfcontained amplifying system which embodies a power pack supply as provided in applicant's invention.

In accordance with the accompanying drawings, appliant illustrates the utilization of his power pack through incorporation thereof in a portable loud speaking and emergency alarm unit which is generally designated 10. This unit includes a case and carrying portion 11, a speaker portion 12, and as illustrated in FIG. 1, an attached microphone 13, which microphone is removably attached onto the case portion 11 through a flexible clip member 14 or the like which clip 14 is substantially cylindrical in shape to hold the cylindrical body portion 15 of the microphone 13. The microphone 13 is equipped with a switch for actuation of and delivery of power to the unit. The case portion includes a handle 16 and, in the form shown, the entire case and handle portion is integrally molded as a one piece unit and is provided with male threads 17 at a forward extending end thereof to receive a capturing ring 18 which capturing ring is designed to hold the speaker 12 to the housing 11 but which also permits removal of the speaker and access to the interior of the housing 11 simply by removing the clamping ring 18 from the units.

The case 11 provides a longitudinally extending passage which therefore defines a receiving cavity 20 within the case 11 which cavity 20 extends from the male threaded ring portion 17 to a closed end 21 of the case. This case unit is preferably waterproof, and connections therethrough such as a switch member 22 and a control button 23 are sealingly provided therethrough to aid and protect the components arranged within the cavity 20.

Speaker 12 basically provides a metal horn exterior 24 with an inner diffuser cone 25 which normally includes the necessary elements of amplification speakers.

For the system utilized by the applicant, a control circuit board 26 is arranged in the closed end of the case 11 and is supported through a plurality of stand off lugs 27. This circuit is mounted in such a position that the power pack designated in its entirety 30 may be positively held between extending portions thereof and inwardly extending portions of the speaker 12, such that the battery pack is securely mounted within the unit. A flashlight power pack, particularly one which is interiorly housed as applicant's pack is housed, normally requires biasing pressure against the ends and contact points of the battery to maintain proper electrical contact between the battery and the powered circuit. With applicant's device, the total connection between the powered components of the unit and the unitary power pack 30 is obtained through electrical conductors attached to lugs on the pack.

The power pack in its entirety is illustrated in FIGS. 3 to 8. As illustrated in FIG. 3, the pack 30 basically includes a pair of resilient, generally circular plate elements 31, 32, each of which is provided with a plurality of apertures designated respectively 31a, 32a therethrough such that connecting posts 33 and at least one conducting connecting post 34 may be received therethrough and utilized to connect the two end plates 31, 32. This connection may be utilized, as in the form shown, by threading one end 33a of the connecting posts in the threaded apertures 31a in plate 31, and providing the opposite end 33b of the posts with threads to which capturing nuts are attached. In this manner then, it would be possible to assemble all of the connecting posts 33 to the first bottom plate 31, place batteries B within the area defined by the upstanding posts, and to thereafter place the cover plate 32 thereon. The connecting posts 33 are also provided with retaining elements extending laterally from the sides thereof. These lateral retaining elements are designated 35 and consist in the form shown, of at least, for the non-conducting connecting posts 33, a pair of angularly arranged longitudinally extending relatively thin plate elements 35a, 35b which are physically attached to the connecting posts so as to provide, as particularly in FIG. 6, a more positive retaining area for the batteries B which are inserted into the area defined by the posts. As illustrated in FIG. 6, the laterally, outwardly extending edges of these plates 35a, 35b will contact selected portions of the batteries B, and permit the same to be slipped easily into the defined area but will prevent the batteries from being removed in other than a longitudinal direction. Utilization of the posts 33 and the particularly designed plates 35 provides a maximum amount of area for the batteries to be received therein while providing a unit which can be completely disassembled and which will be relatively less expensive to manufacture as compared to a continuous encircling can or the like.

As stated, one of the connector rods 34 provides conductivity between the lower or bottom 31 plate and a convenient location above the upper plate 32. Obviously, this electrical connection could be provided in many forms, but applicant has chosen to utilized a threaded rod which has one end receivable into a tapped aperture 31a of the bottom plate and is captured thereto with a hexnut 36 or other capturing device. The upper end of this conductor rod 34 extends through plate 32, and as illustrated therein, a pair of capturing cap nuts 36 are provided to retain the lug 37 of a conductor 38 positively to this conductive connecting post 34. As stated, an object of this particular connecting post 34 is to provide a means of completing the circuitry through the battery pack, and many forms could be utilized to obtain the same, but with applicant's approach of utilizing this threaded rod, an additional battery retaining lateral plate 37 may be placed upon the rod 34 between the two cover plates 31, 32, thus completing the holding area defined by the otherwise provided holding plates 35. In the form shown, then, six such posts may be provided, and each post is provided with a battery retention laterally extending plate for holding the batteries within the confined and defined area.

The battery pack obviously must provide continuous circuitry for the delivery of power therefrom, and to provide this system, it should be obvious that the batteries will be operated in series, and therefore, continuity for the series connection must be maintained. Applicant provides such continuity by particularly arranging the batteries in aligned logical sequence with connections being made between sequential extensions of the circuit by providing connecting tabs designated 40 on both the interior surface of the bottom plate 31 and interior surface of the upper plate 32. In the form shown, these connecting tabs or links provide a means for connecting the ends of batteries which abut with the plate to an adjacent longitudinal set of such batteries which likewise abut the plate such that the batteries will be positively aligned and maintained in their proper plus-minus relationship with the tabs providing the proper electrical conductivity between the longitudinal sets. To obtain proper continuity of the circuit, a second conductor 41 is provided, and this conductor, through a tab 42, is positively attached to one of the non-conductive posts and held thereto and against the plate 32 by a nut or capturing element 33c and an innerconnecting tab 44 extends therefrom and is positively joined through the plate with a rivet 44a or the like to provide one conductor point 45 which is obtained from, what may be termed, the exterior of the plate 32 to the interior of the plate 32. This connector is designated 45 and is illustrated in FIG. 8. This same arrangement must be provided for the continuance of the circuit from the opposite end of the battery pack 30 and particularly from plate 31. To accomplish this, what may be termed a last conductor point 47, is provided on plate 31, and an inner connecting tab 48 extends therefrom to the area into which the conductor post 34 will be received and which conductor post is held thereto by the aforementioned nut 36. The sequence of the connector tabs 40 on both the inner surface of the upper plate and the inner surface of the lower plate must obviously be aligned for the continual series connection such that, and for this reason, certain of the batteries will be reversed or certain sets of the batteries will be reversed with regard to their positive and negative poles with regard to other batteries in the pack. The tabs illustrated in FIGS. 7 and 8 are one such set which will provide such conductivity, but it should be obvious that this same conductivity could be provided through arrangement of such tabs in various forms.

To further protect against possible shorting of the electrical energy, an insulating plate 50 is provided on the outer surface of the upper plate 32, and this insulating plate extends entirely across plate 32, and as illustrated, is held below the lug and connector combination at the conductive connector post 34 and an opposite connector post 33.

Figure 2:
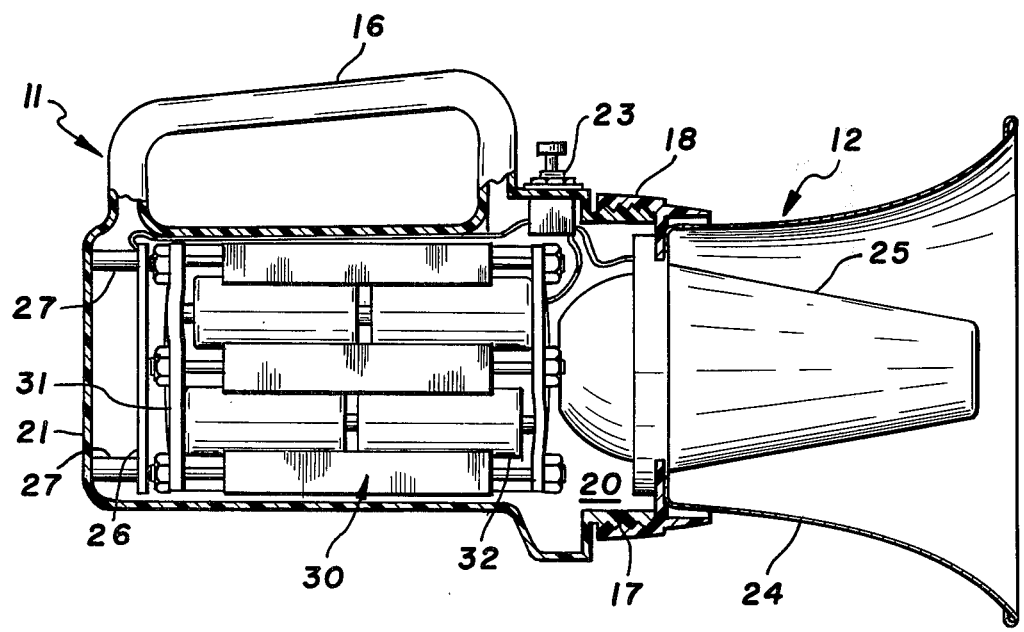
FIG. 2 is a longitudinal cross section taken from the view of FIG. 1 and illustrating the location of the various elements including the power pack system provided by applicant in placement within the unit of FIG. 1.

In order to maintain proper relationship of the poles of the batteries with respect to the upper and lower plates 31, 32, and to utilize the deformability thereof, spacing members 40a, 40b are provided generally centrally of the plates 31, 32 and these spacing members are, in the form shown, arranged between the connective tabs 40 and the plates. These particular spacing members 40a, 40b are positioned to be in alignment with the center batteries of the unit and will insure the deformation of the plates 31, 32 upon tightening of the elements 33c against the upper plate. With the location of these spacing members, it should be obvious that, upon tightening of the elements 33c to draw the upper plate 32 against the batteries, the added spacing will particularly deform the lower 31 and upper plate 32 into the curved configuration as illustrated in FIGS. 2 and 4. This, added central spacing, will insure that the batteries are properly maintained in conductive relation and the deformable material utilized in the plates 31, 32 will assist to accomplish this effect. This deformation, caused by this added spacing will further insure contact of the batteries through various conditions of operation such as heat or cold.

Another of the important aspects of the applicant's invention is the maintenance of the positive electrical contact between the batteries without the utilization of any biasing members therein by providing the plates 31, 32 to be of a deformable material. The applicant has found that proper tension may be placed upon each of the connecting rods through the connecting members 33c, particularly in view of the placement of the spacing members 40, 40b. This deformation will positively hold the batteries longitudinally and will maintain them in proper electrical contact, not only between themselves, but with the connecting tabs 40 on both of the plates 31, 32. With this combination, it should be obvious that what applicant provides, even though the same is illustrated in a specific amplifier case, is an energy pack that is completely self-contained and which may be removed from the unit, be stored, or used as a complete battery unit. An advantage of applicant's device over normal single battery systems is the additional energy which can be placed into an area normally used by the single battery. With applicant's device 14, individual "C" size batteries may be utilized. With batteries that are rated at 1½ volts, this will produce 21 volts when connected in series as compared to the normal 6 or 12 volt batteries that are utilized in the same space. This additional power obviously will provide a longer lasting unit and a more powerful unit.

It should be obvious that the battery pack provided by the applicant provides a unique configuration for the mounting of individual batteries as compared to those systems which require large individual batteries.

It should be noted that applicant has provided a circumferentially and longitudinally defined area to hold a plurality of layers of batteries, the length and area to so hold the batteries capable of being modified to decrease or increase the number of batteries without departing from the scope of the invention.

A unique concept of applicant's battery pack lies in the retention system for circumferentially retaining the batteries and the combination therewith of the means for longitudinally, positively positioning the batteries without the utilization of any additional biasing elements or the like.

What I claim is:

1. A packaging and containing structure for combining a plurality of power sources to provide a power supply, said structure including:
   a. a first, deformable plate member having a power source contact on one side thereof;
   b. a second, deformable plate member having a power source contact on one side thereof;
   c. a plurality of longitudinally adjustable connecting means being arcuately positioned on each of said plates and extending therebetween for connection thereof and providing a defined ring of said spaced connecting means for retaining a plurality of power sources in side by side relation therein;
   d. means for longitudinally adjusting the connective length of said adjustable connecting means to electrically clamp a power source between sid plates;
   e. one of said longitudinally adjustable connecting means being electrically conductive and being connected to said power source contacts; and,
   f. electrical conductive means provided respectively on each of said plates whereby said energy providing structure may be utilized in an electrical circuit.

2. The structure set forth in claim 1 and said longitudinally adjustable connecting means including means to deform said first and second plates to clamp a power source between said plates.

* * * * *